(12) United States Patent
Olson

(10) Patent No.: US 6,406,218 B1
(45) Date of Patent: Jun. 18, 2002

(54) LOW-FLOW-CONTAMINANT-ADSORBING SYSTEM

(76) Inventor: Norman L. Olson, 2453 Bethel Ave., P.O. Box 637, Port Orchard, WA (US) 98366

(*) Notice: Subject to any disclaimer, the term of this patent is extended or adjusted under 35 U.S.C. 154(b) by 0 days.

(21) Appl. No.: 09/609,990

(22) Filed: Jul. 5, 2000

(51) Int. Cl.⁷ .................................................. E06F 1/00
(52) U.S. Cl. .............................. 405/36; 404/2; 404/4; 404/25
(58) Field of Search ................... 404/2, 25, 4; 405/36, 405/41, 60; 55/486

(56) References Cited

U.S. PATENT DOCUMENTS

| | | | |
|---|---|---|---|
| 1,152,901 A | * 9/1915 | Naylor | |
| 4,460,465 A | * 7/1984 | Zacharkow et al. | 210/266 |
| 5,082,013 A | * 1/1992 | Scheib | 137/1 |
| 5,297,895 A | * 3/1994 | Johnson | 405/41 |
| 5,503,742 A | * 4/1996 | Farley | 210/238 |
| 5,676,834 A | * 10/1997 | Kuntz | 210/321.6 |
| 5,720,574 A | * 2/1998 | Barella | 405/52 |
| 5,832,673 A | * 11/1998 | Cho | 52/19 |
| 6,019,809 A | * 2/2000 | Kahlbaugh et al. | 55/486 |
| 6,048,456 A | * 4/2000 | Palmer | 210/282 |
| 6,077,423 A | * 6/2000 | Roy et al. | 210/121 |
| 6,106,707 A | * 8/2000 | Morris et al. | 210/163 |

FOREIGN PATENT DOCUMENTS

DE 29913401 U1 * 11/1999 ............. C02F/1/00

* cited by examiner

Primary Examiner—Thomas B. Will
Assistant Examiner—Raymond W Addie
(74) Attorney, Agent, or Firm—Miller Nash LLP

(57) ABSTRACT

A structure for use with low flow stormwater drainage includes a two-piece outer cylindrical housing and a removable inner cylindrical flow cartridge containing a replaceable filter media. The housing consists of a sealed basin with a removable lid. The cartridge is suspended within the housing by an open tubular mechanical support extending downward from the housing lid. The bottom of the cartridge is above the bottom of the housing. The cartridge has a permeable screened bottom and a screened orifice at the top where the open tubular support attaches. An inlet into the housing accepts fluid flow transverse to the vertical axis of the cartridge at a depth location near the cartridge vertical midpoint. In operation, hydrostatic head pressure forces stormwater flow into the housing where primary separation of insoluble contaminants occurs. Contaminants with a density less than water remain inside the housing but outside the cartridge at a depth near the housing lid. Contaminants with a density substantially greater than water remain inside the housing but outside the cartridge at a depth near the housing bottom. The separated stormwater flows through the cartridge bottom permeations, upward through the filter media where secondary treatment occurs then out the open tubular support. Secondary treatment removes targeted dissolved and suspended contaminants through adsorption and filtration.

3 Claims, 8 Drawing Sheets

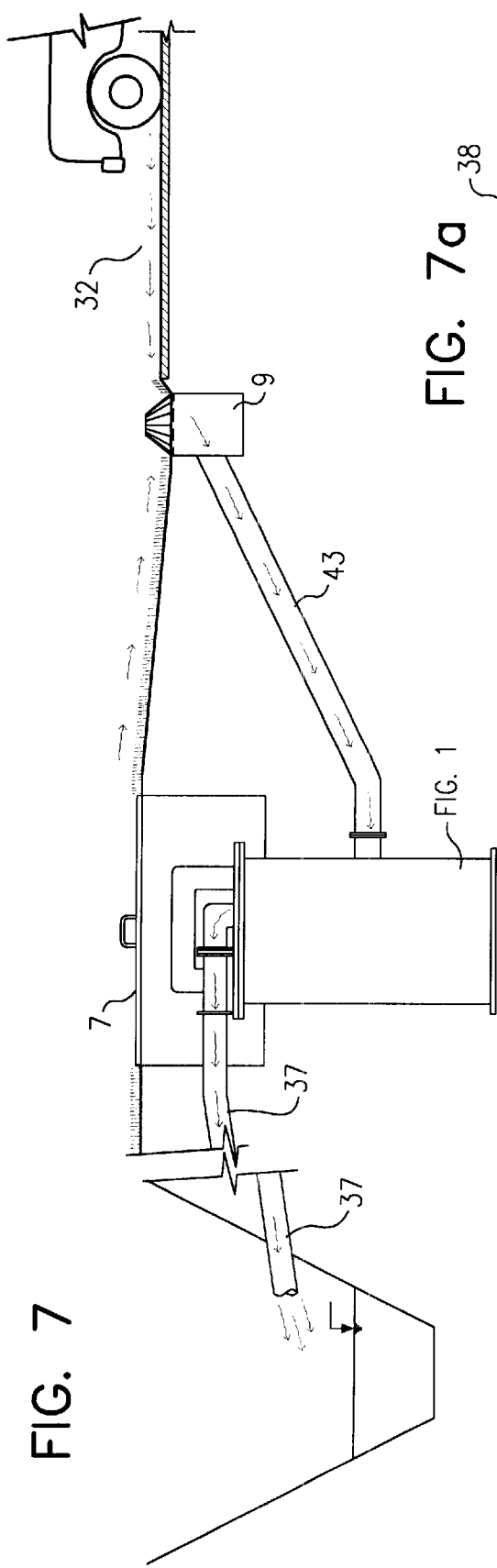
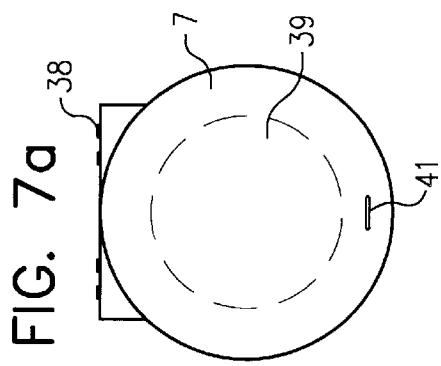

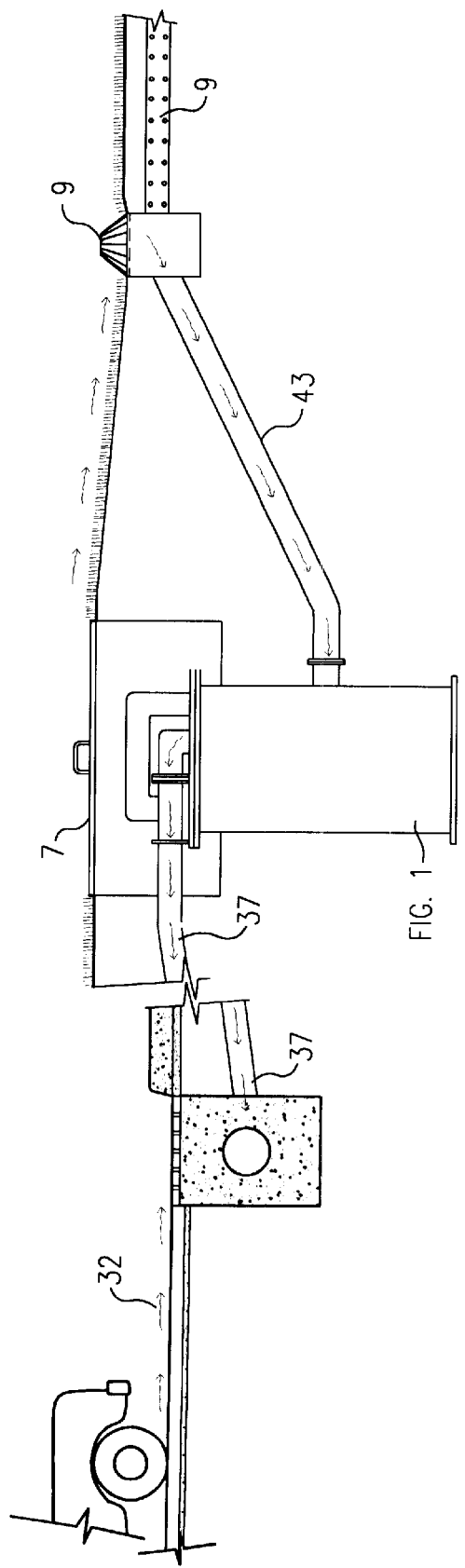
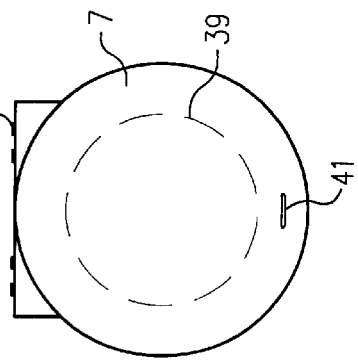
FIG. 8
FIG. 8a

LOW-FLOW-CONTAMINANT-ADSORBING SYSTEM

FIELD OF THE INVENTION

The present invention relates generally to stormwater drainage structures and associated hardware, which are particularly suited for separation of contaminants from water. More particularly, the invention provides for a contaminant separating, filtering and absorbing apparatus that performs especially well in low flow areas with minimal available head pressure differential, such as small landscaped yards and small driveways and parking lots.

BACKGROUND OF THE INVENTION

Drainage structures designed to collect stormwater runoff such as drainage inlet basins for roads and parking lots are widely known and used. Typically, the structure only provides the means to collect runoff from impervious or semi-impervious surfaces and direct the flow towards a system of pipes and/or tanks to convey and/or store the stormwater. Undesirable material added to the water during surface flow, either dissolved or suspended, such as oil, fuel, pesticides and the like, are transported within the drainage flow to the water body destination such as a lake or stream.

Recent concerns regarding water quality issues related to the stormwater runoff has prompted governmental regulation. The typical drainage structure does not remove or reduce the concentration of the undesirable material (contaminant). Therefore, requirements for supplemental devices designed to improve water quality, such as biofiltration swales, settling ponds, fluid/particle density separators, mechanical separators and media absorbers/filters now exist. The present invention can be classified as a stormwater quality-improving device combining fluid/particle density separation and media adsorption/filtration that is exceptionally suited for low flow applications.

The compact size, ease of operation and maintenance, low expense, and self contained design make this invention exceptionally suited for uses such as a filter system in a private yard. By installing a basic curtain drain system 9 and/or swale system to collect the yard runoff and using the system drain to feed the inlet pipe, the runoff can easily be treated for removal of applied fertilizers, herbicides, and pesticides. Additionally, runoff from driveways, impervious work areas and patios can be caught in basins, conveyed through solid pipe 43 to the inlet of the present invention, and treated for the removal of contaminants such as oil, gas, grease, and other related chemicals.

BRIEF DESCRIPTION OF THE DRAWINGS

FIG. 7 is a perspective view of the embodiment attached to a surface inlet and outlet configuration;

FIG. 8 is a perspective view of the embodiment attached to a subsurface drainage system configuration.

DETAILED DESCRIPTION OF A PREFERRED EMBODIMENT

Figure 1:
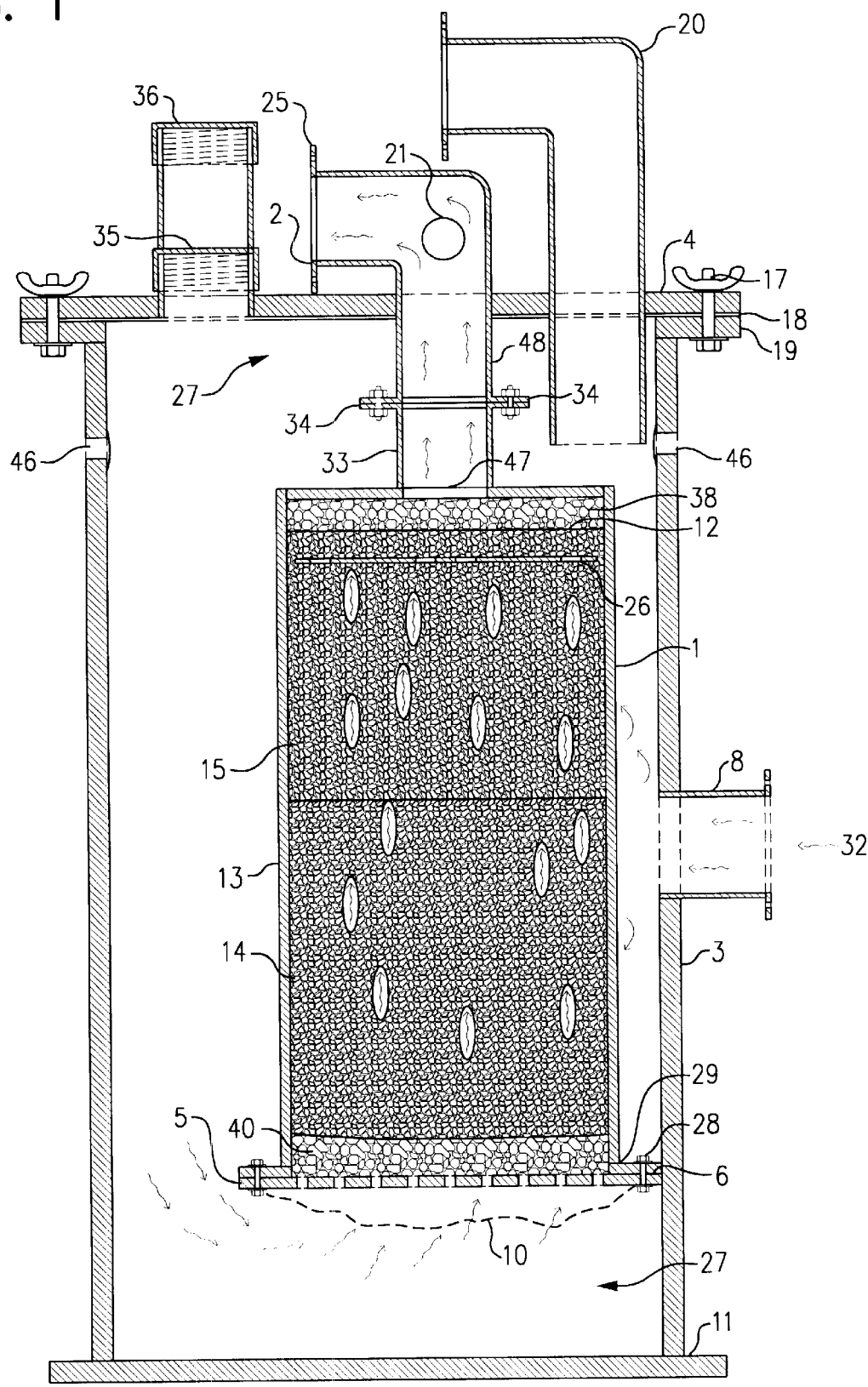
FIG. 1 is a cross sectional view of the structure.

The present invention (FIG. 1) is a fully-contained system designed for low stormwater flows allowing for less expense and more site flexibility as compared to other fully-contained systems. The invention is designed specifically for removal of point source contamination from small sites. Therefore, in general, the system will only encounter low stormwater flow.

The subject site that is the source of the stormwater flow to the system is hydrologically analyzed and subsequently engineered to match the system's configuration. Analyses for anticipated stormwater runoff given the target maximum design storm (precipitation timing and intensity) and specific site parameters such as topography and soil types are conducted. As such, the specific site stormwater conveyance methods must be designed to compliment the properties of the present invention for optimum system function, as dictated by site design requirements.

A cylindrical elongated housing basin 3 which has a sealed flat bottom 11 and smooth solid sides, hosts the system inlet point 8 which is at a lower elevation than the system outlet point 2. Water enters the cylindrical housing 3 at approximately the vertical midpoint of the cartridge; an elevation that is well below the housing lid 4 and well above the filter media cartridge bottom inlet 5

The location of the filter media cartridge 1 and cartridge flange 6 relative to the housing 3 affects the stormwater 32 entering the housing 3. At entry into the housing 3 the stormwater 32 strikes the inner cartridge outer wall 13 which both slows the flow momentum and disperses the flow. Because cartridge 1 is oriented such that flange 6 is located directly under the inlet 8 into the housing 3, the flow direction is forced laterally 29 around the cartridge. Flow directed in this manner minimizes shortcutting of the flow directly downward into the perforated filter media cartridge inlet 5, thus assuring maximum time for pre-treatment.

Contaminants such as oil, grease, fuel and the like separate from the collected water and rise to storage well 27 above the cartridge to remain indefinitely until system cleaning. Denser portions of the suspended particulate material flow down past the filter media cartridge bottom 5 to settle on the bottom of the housing 11 to remain indefinitely until system cleaning. This initial treatment is the particle/fluid density separation process.

The secondary treatment, the adsorption/filtration phase, begins when the collected water is forced into the filter media cartridge 1 through the permeable screened bottom inlet 10 and the perforated filter media inlet 5 attached to flange 6 with flange bolt 28. The screen 10 along with a layer of washed gravel 40 on the interior base of the cartridge retains larger particles from traveling upwards into the cartridge 1 and also keeps the filter media 14, 15 within the cartridge 1.

The filter media 14, 15 employed within the cartridge 1 is dependant on the type(s) of contaminants expected in the stormwater 32. Filter media materials such as activated carbon can be used for the removal of pesticides, herbicides and oil and fuel. Amorphous siliceous materials impregnated with charged polymers materials can be used for the removal of nutrients. The life of the material is dependant on specific site characteristics.

The upward momentum of the water through the filter media 14, 15 is driven by the differential hydrostatic pressure resulting from the collection points at the site existing at higher elevations than the elevation of the outlet 33 from the filter media cartridge 47 and at a higher elevation then outlet 2 from the housing (FIGS. 7 & 8).

The inlet into the filter media cartridge is also lower than the outlet pipe elevation which produces an upward flow through the filter media. The upward flow is superior to horizontal flow through structures and vertical downward flow because reduced channeling through the media with an upward flow decreases inefficient use of the filter, and plugging of the filter material is decreased due to the buoyancy and upward flow force resulting from the upward flow.

At the outlet orifice 47 (FIGS. 1 & 4) located at the top of the filter media cartridge 1 an outlet screen 12 and an upper layer of washed gravel 38 are present to retain the filter media 14, 15 from exiting through the orifice 47. The outlet screen 12 and washed gravel 38 are sized and positioned as a function of the perforated surface area of the screen 12 relative to the area of the orifice. Larger screen and washed gravel surface areas are required as the size of the orifice 47 increases or as the mesh of the screen decreases.

Figure 3:
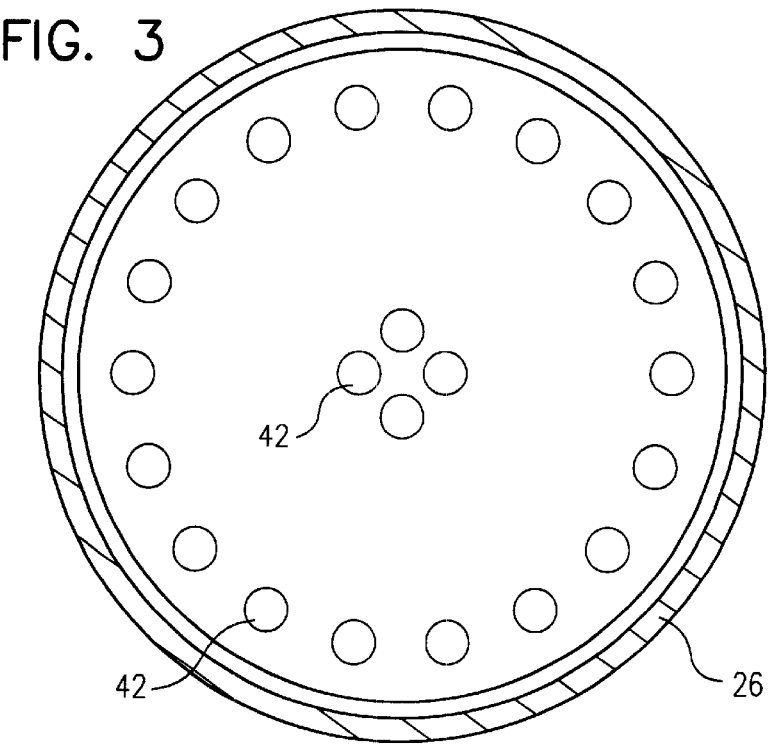
FIG. 3 is a cross sectional view of the cartridge showing the flow dispersion ring.

The combination of the buoyancy of the filter media 14, 15 and the upward momentum of the water allow for a relatively uniform distribution of upward flow and a relative uniform mixing of the contents. Thus most of the filter media's surface is in constant contact with the collected water requiring treatment. However, to assure clogging and channeling is minimized, a flow dispersion disk 26, which is the same diameter as the inside of the filter media and contains numerous perforations 42, can be inserted into the filter media cartridge 1 (FIGS. 1 & 3) parallel with the cartridge's 1 top and bottom surfaces and far enough down from the top of the cartridge so as to allow the disk to be surrounded with filter media 14, 15 on all sides. The flow dispersion disk 26 minimizes channeling by forcing a flow that would otherwise tend to concentrate towards the center of the cartridge (due to the outlet orifice location at the center of the cartridge) to diffuse through the disk perforations.

Treated water from the system is discharged through the outlet pipe 37 that is at a lower elevation than the site collection points. The overflow pipe 20 is at a lower elevation than the site collection points but at a higher elevation then the outlet pipe 37. Moreover, the inlet of the overflow pipe 20 is situated well below the water surface contained within the system housing 3 (FIG. 1) to assure the collected oil, grease and fuel is substantially retained during an overflow event. The outlet pipe valve 25 (FIG. 4) separates the outlet port 47 in the housing lid 4 from the outlet pipe 37. A backflush and sampling port 21 is located between the outlet pipe valve 25 and filter media cartridge 1. Closing the outlet pipe valve 25 allows either flow to discharge from the sampling port or flow in a reverse direction and backflush the cartridge.

Figure 5:
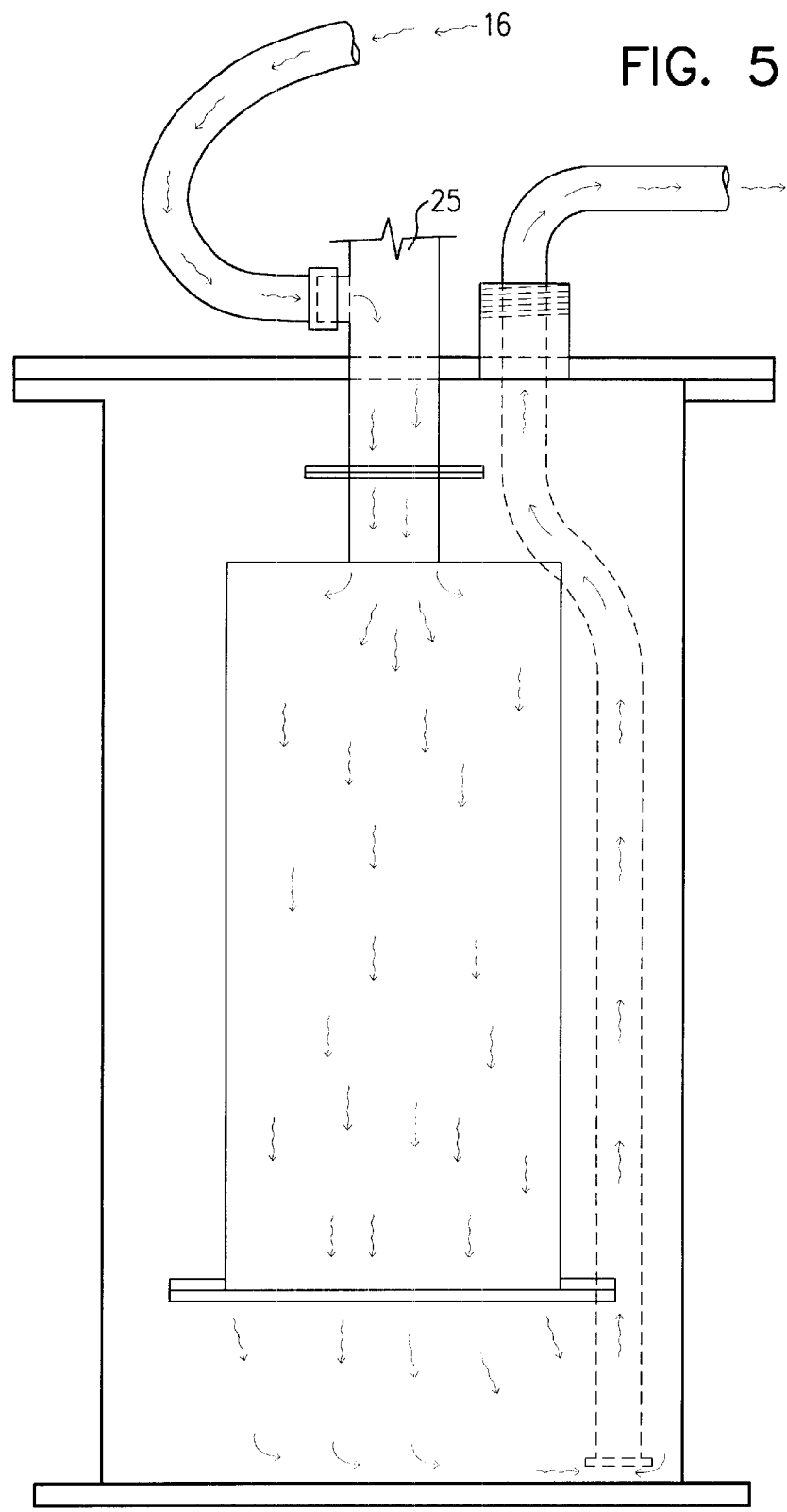
FIG. 5 is a cross sectional view of the structure showing a backflush connection.

A distinct advantage of the present invention is the ability to backflush the system if clogging or related problems occur (FIG. 5). In the case of clogging or related problems, the valve in the outlet pipe 25 is closed, a water source 16 is attached to the backflush/sampling port 21 and water is forced downward in the opposite direction of operational flow to remove the obstruction. This is continued until the clog or related problem is removed.

Figure 2:
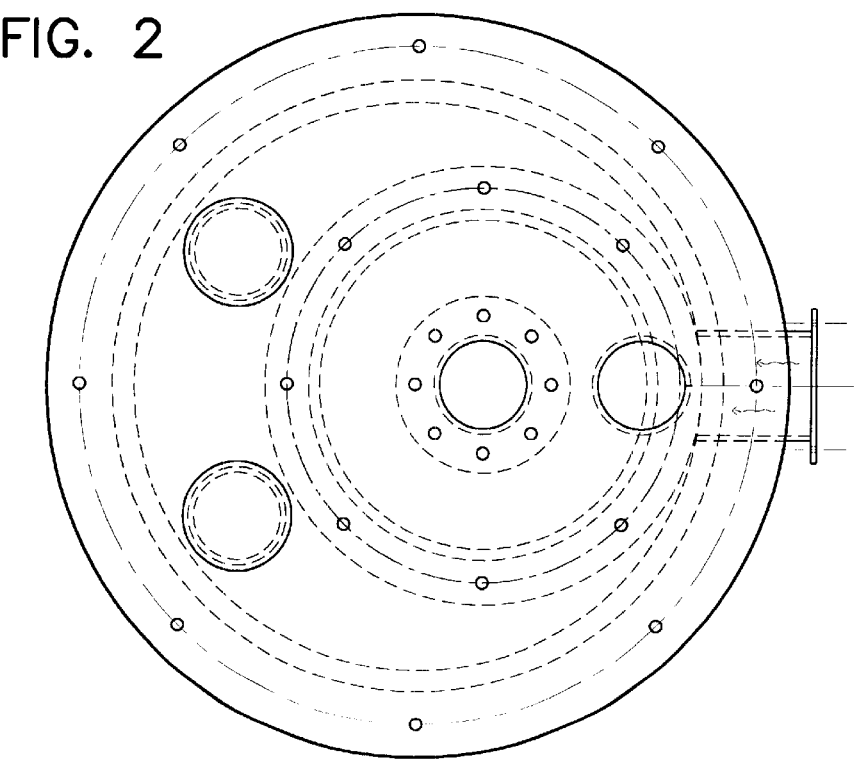
FIG. 2 is a top view of the housing lid.
Figure 4:
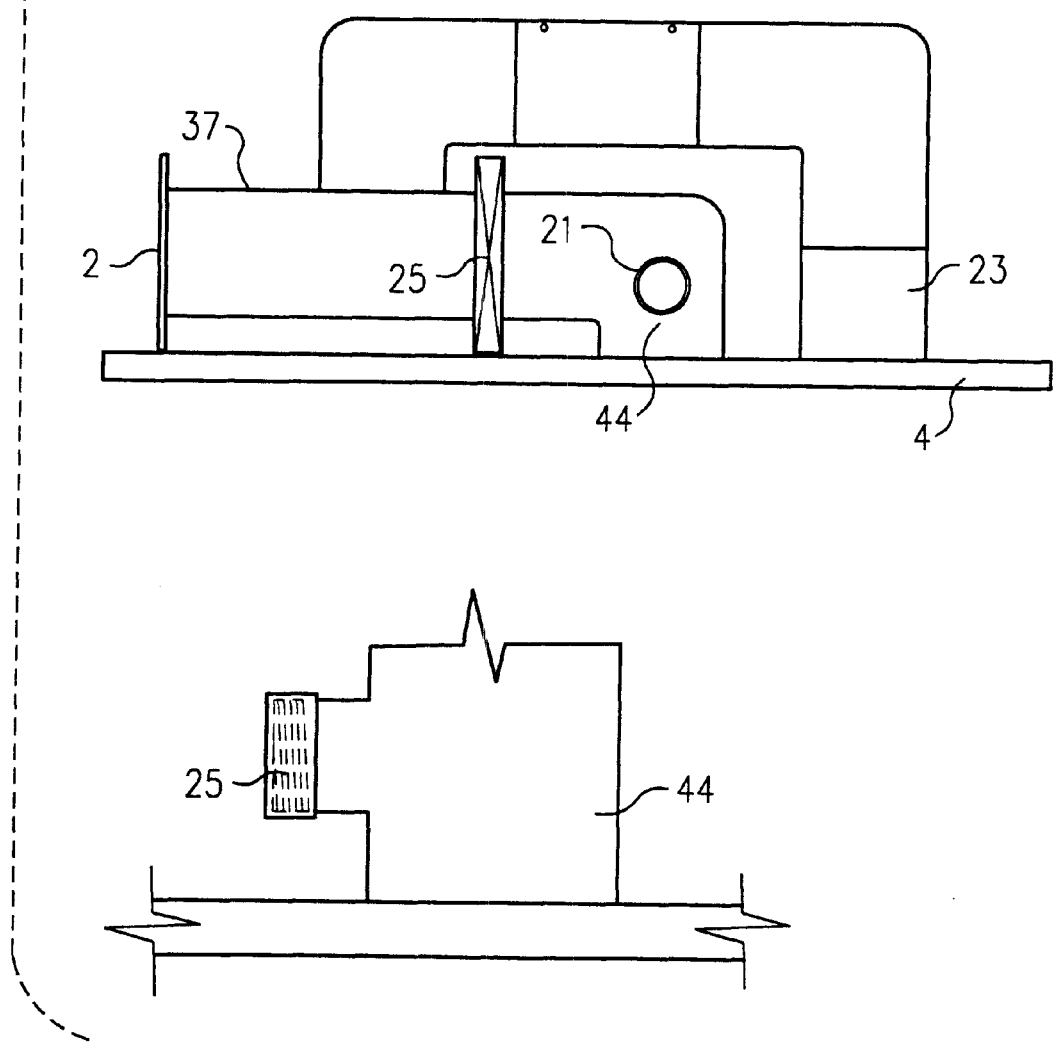
FIG. 4 is an elevation view of the housing lid showing the outlet and overflow configuration and an enlarged elevation view of the backflush/sampling port.

A further advantage of the present invention are the different functions resulting from the housing lid design (FIGS. 1, 2 & 4). First, the lid 4 attaches to the housing body 3 via a flanged connection 17, 18, and 19 for easy removal from the top. This flange connection 17, 18, and 19 is sealed watertight. Second, the filter media cartridge 1 is suspended within the housing 3 by a structural connection 34 to the lid through the open tubular support. A mechanical connection 34 mid-way along this tubular support allows the filter media cartridge 1 and the housing lid 4 to be detached from one another once both are removed from the housing basin. This suspended connection 34 allows for the particle/fluid density separation cleanup and allows for easy removal of the cartridge 1 when filter media replacement is required. Third, The outlet 44 and overflow 23 ports are easily accessible from the surface which makes sampling and backflushing easily and economically accomplished. Fourth, testing and mixing ports 35, 36 (FIG. 1) through the lid allow for easy and practical routine monitoring of the system for contaminant removal efficiency. Fifth, the system can be buried in the ground several feet vertically to allow long cartridge flow paths. Given an insignificant head loss through the cartridge 1, the vertical distance of burial does not affect the relative elevations required for the inlet and outlet. This is an advantage over other related inventions when subject sites have topography constraints. Finally, placement of the lid below the ground surface and covering with a second, more esthetically pleasing lid (FIGS. 7, 8 & 9) allows the entire system to be buried and not visible while still allowing all the functions described above. The lid is comprised of a surface hatch 7 with a surface hatch handle lid 39 and hinge system 38 for opening the lid which covers the system housing 3.

A perforated embodiment (FIGS. 1 & 9) can be designed into the outer housing structure 24 or inlet lines 46 to facilitate longer media life and self backflushing if the existing site conditions are conducive. The perforated embodiment (FIG. 9) is for use in sites where existing soils are determined to be of relatively high permeability and where the water table is low.

Figure 9:
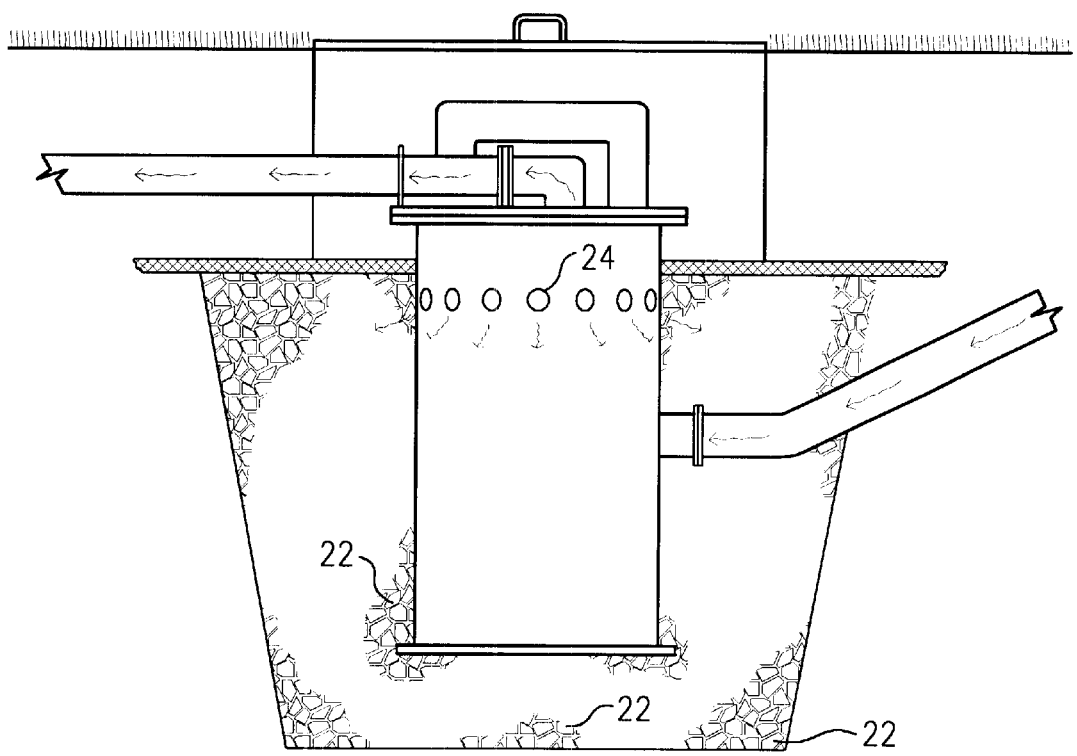
FIG. 9 is a perspective view of the embodiment with a perforated outer housing.

Perforations 24 are placed into the side of the outer housing wall 24 and/or into the inlet pipe 46 at elevations below the housing lid elevation. Drainage facilitating material 22 is placed in the area outside the housing 3 to allow for infiltration of existing water into the ground (FIG. 9). During initial and low stormwater flows the water flows out the perforated housing 24 and is infiltrated into the earth instead of flowing through the inner cartridge 1 and filter media 14, 15. This can prolong the media life by allowing some of the flow to be bypassed. Furthermore, if the perforations 46 are placed at elevations below the invert of the outlet pipe (FIG. 1), following rain events causing sufficient flow to be discharged from the outlet 2, the infiltration will again take over and the cartridge 1 will self backflush an equivalent volume of water as that contained in the piping 33 above the inner cartridge 1 and below the outlet invert 48. This small backflush can also facilitate longer media life and reduce the required maintenance to the system.

The invention also allows for periodic scheduled testing of the media removal efficiency which determines when changing of filter media is required. One method of testing is by adding organic dyes to the system such as the salt fluorecein, which is very water soluble. Generally, pesticides and herbicides contain heteroatoms such as nitrogen or halogens within their molecular structure and are thus absorbed from the water onto the carbon more readily than the highly water soluble dye that does not contain the heteroatoms. Therefore, these dye compounds can be used to model the pesticides and herbicides through the testing process to assess worst-case removal efficiency. Their fluorescent indicative properties allow for visible result detection. Moreover, the specific design of the present invention allows for the relatively quick and simple use of the dyes for testing.

During a time of zero flow, the dye is added to the collected water contained within the housing but outside the cartridge. The dye is injected through a resealable port 31 in the housing lid 4. The present invention configuration (FIG. 1) allows for rapid mixing of the dye and the liquid contained by the movement of at least two paddles inserted through the resealable ports 31 in the housing lid 4 to a depth approximately equal to the vertical midpoint of the cartridge. Thus a well-mixed solution of the dye and stormwater results before substantial diffusion of the dye into the cartridge 1 occurs. The paddles are inserted such that mixing of collected oil and fuel at the surface and settled solids at the bottom does not occur significantly. At this time a solution of the dye in water is added through the inlet 8 into the housing 3. The dye solution added is at the equivalent concentration to the liquid previously mixed within the outer housing.

Figure 6:
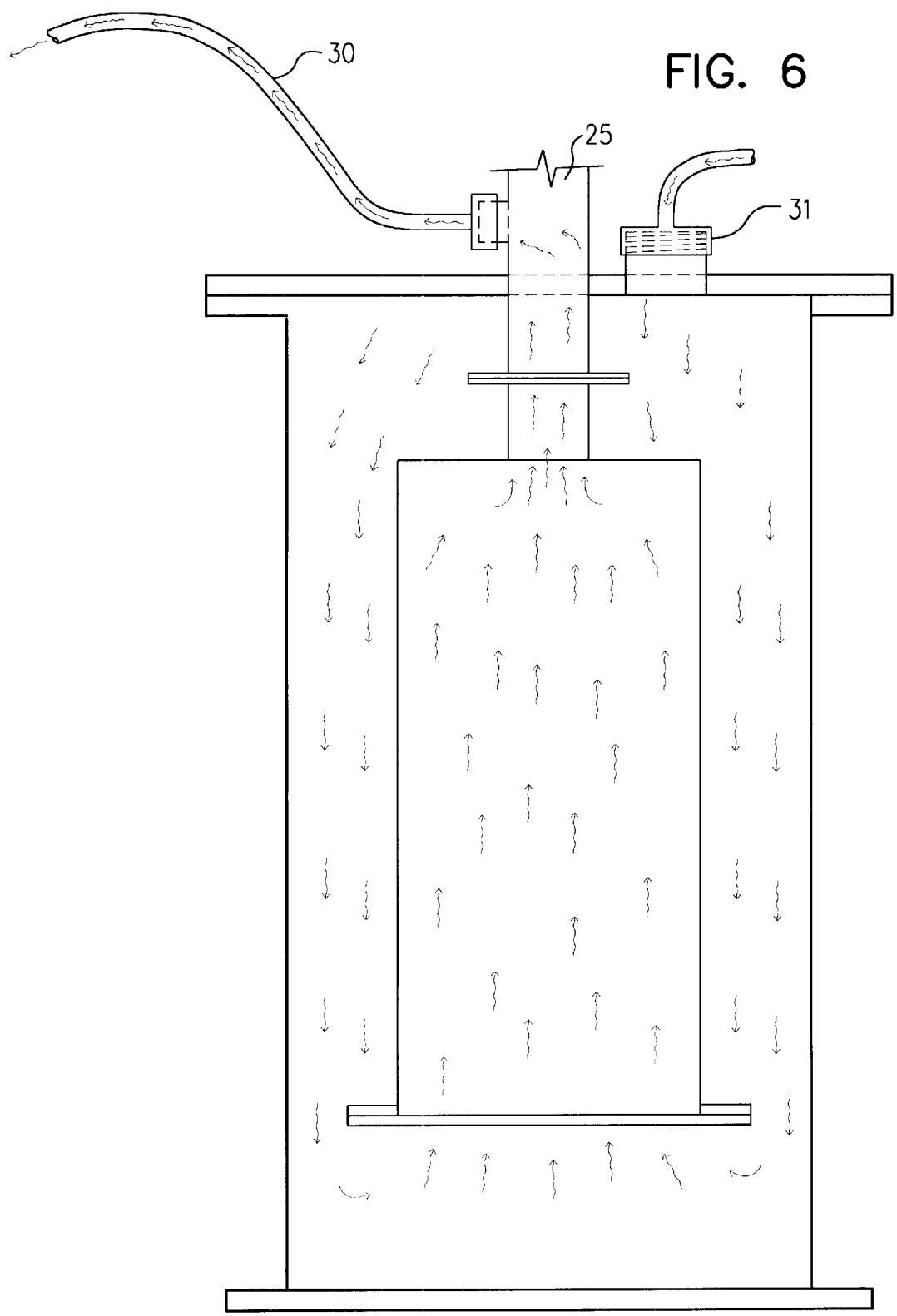
FIG. 6 is a cross sectional view showing a sampling connection.

After adequate time is allowed for the cartridge to be completely flushed with the dye solution, samples are taken by means of a sampling tube 30 at the system outlet (FIG. 6). An assessment of the removal efficiency of the filter media is then performed by comparing the intensity of the dye solution sampled from the system outlet to that of a dye reference standard and then subsequently comparing the calculated dye concentration sampled from the outlet to the known concentration added to the inlet.

What is claimed is:

1. A gravity flow storm water drainage system having a housing basin, said system comprising:
    (a) a filter media cartridge positioned within said housing basin;
    (b) said filter media cartridge for filtering storm water that passes through said housing basin;
    (c) said housing basin having an inlet and an outlet;
    (d) said outlet located above said inlet;
    (e) a sealed lid removable from said housing basin;
    (f) said removable sealed lid for replacing said filter media cartridge;
    (g) said outlet positioned in said removable sealed lid; and
    (h) said filter media cartridge suspended from said outlet.

2. The system of claim 1, said system further comprising:
    (a) a closeable outlet pipe valve;
    (b) said closeable outlet pipe valve located on said outlet above said removable sealed lid;
    (c) a sampling/backflushing port; and
    (d) said sampling/backflushing port located on said outlet between said closeable outlet pipe valve and said removable sealed lid.

3. The system of claim 1, wherein said filter media cartridge is connected to said removable sealed lid.

* * * * *